United States Patent [19]

Miller

[11] Patent Number: 4,690,070
[45] Date of Patent: Sep. 1, 1987

[54] HATCH COVER STRUCTURE

[75] Inventor: Roy W. Miller, Highland, Ind.

[73] Assignee: Pullman Rail Leasing Inc., Chicago, Ill.

[21] Appl. No.: 819,198

[22] Filed: Jan. 15, 1986

[51] Int. Cl.⁴ ...................... B61D 39/00; B65D 45/28
[52] U.S. Cl. ..................................... 105/377; 220/314
[58] Field of Search ................. 105/377; 220/1 T, 314

[56] References Cited

U.S. PATENT DOCUMENTS

| | | | |
|---|---|---|---|
| 2,372,369 | 3/1945 | Ditchfield | 105/377 |
| 2,816,683 | 12/1957 | Miers et al. | 105/377 X |
| 3,228,353 | 1/1966 | Carney, Jr. | 105/377 |
| 3,307,498 | 3/1967 | Stevens | 105/377 |
| 3,789,776 | 2/1974 | Funkey | 105/377 |
| 4,126,094 | 11/1978 | Zimmerle et al. | 105/377 |
| 4,179,999 | 12/1979 | Cotten | 105/377 |
| 4,201,312 | 5/1980 | Basile | 220/314 |
| 4,365,832 | 12/1982 | Treppler | 105/377 X |
| 4,570,816 | 2/1986 | Ferris et al. | 220/314 |

Primary Examiner—Randolph A. Reese
Attorney, Agent, or Firm—Richard J. Myers

[57] ABSTRACT

A plastic hatch cover is secured over a hatch opening by a hold-down bar extending across the hatch opening above the hatch cover. The hold-down bar has one end pivotally connected with a hinge bracket on the upper deck and another end engageable with a latch structure for sealing the hatch cover. The hatch cover is secured to the hold-down bar by clips on the hold-down bar adjacent the latch structure and adjacent the hinge. The clip adjacent the hinge detaches from the rest of the hold down bar when the hinge bolt is withdrawn, allowing removal of the hatch cover. Lug portions extend upwardly from the hatch cover to engage the hold-down bar to prevent lateral motion of the hatch cover with respect to the hold-down bar. The hatch cover is provided with reinforcing webs on its upper surface and on its lower surface.

30 Claims, 8 Drawing Figures

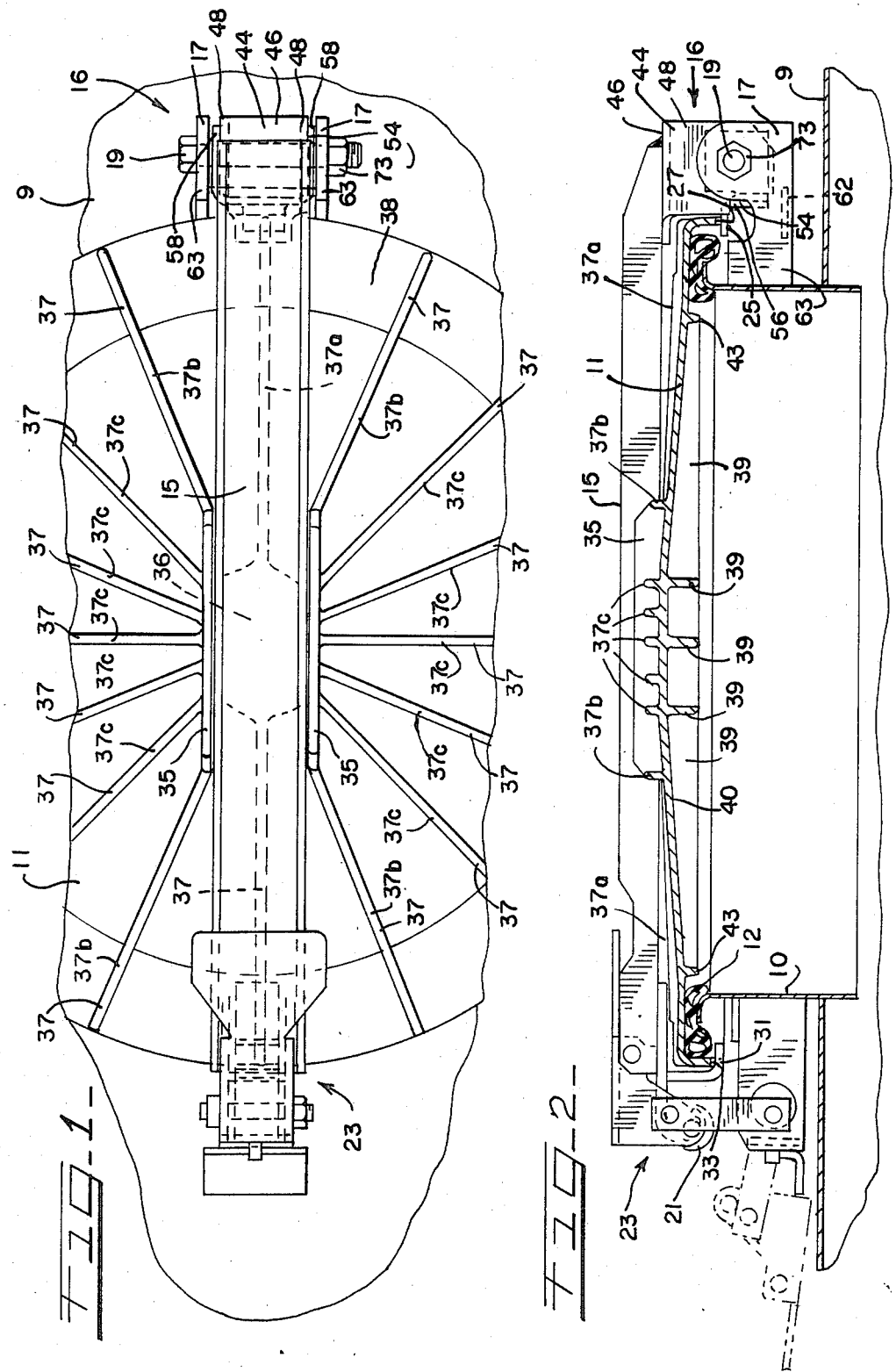

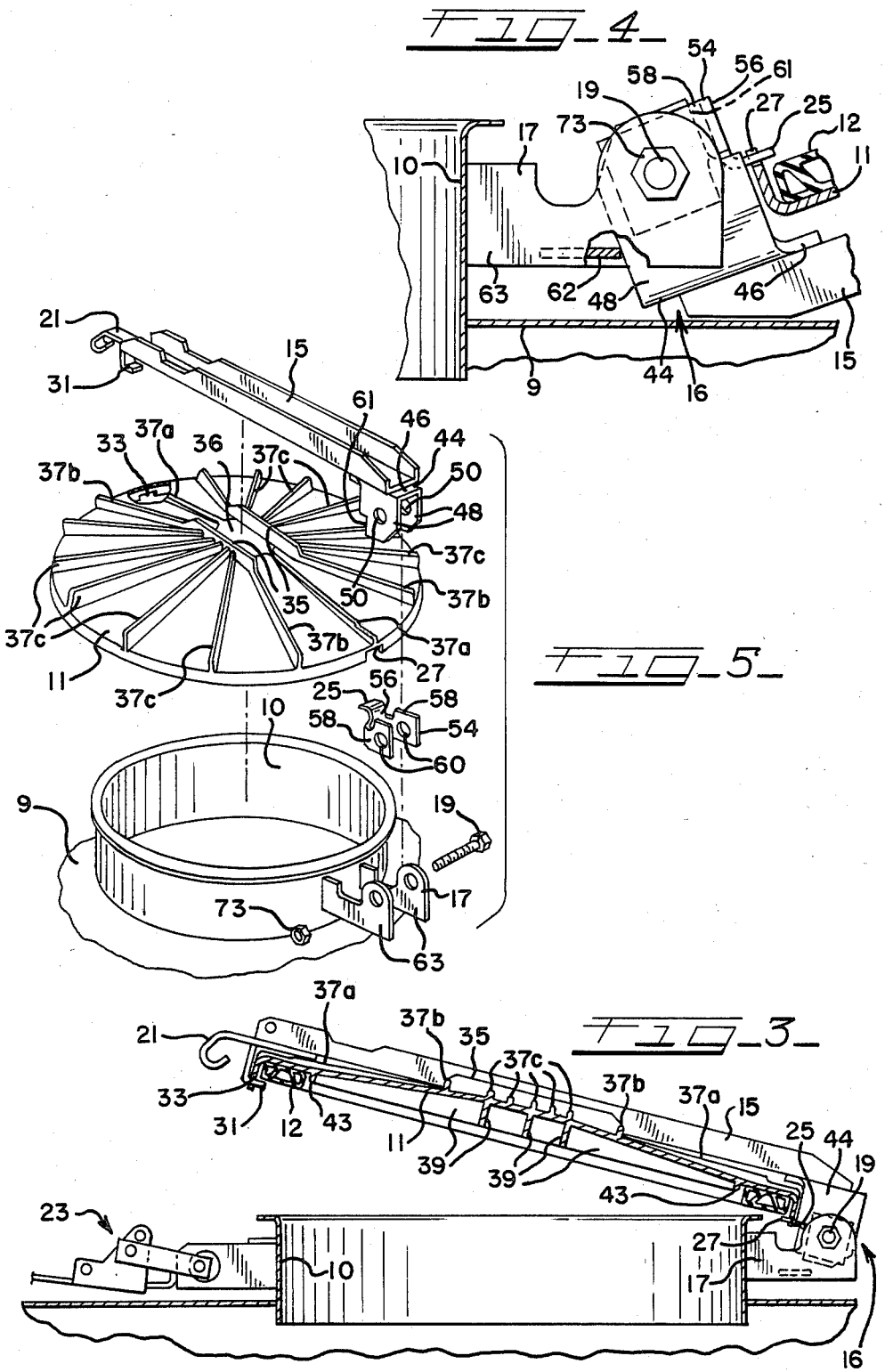

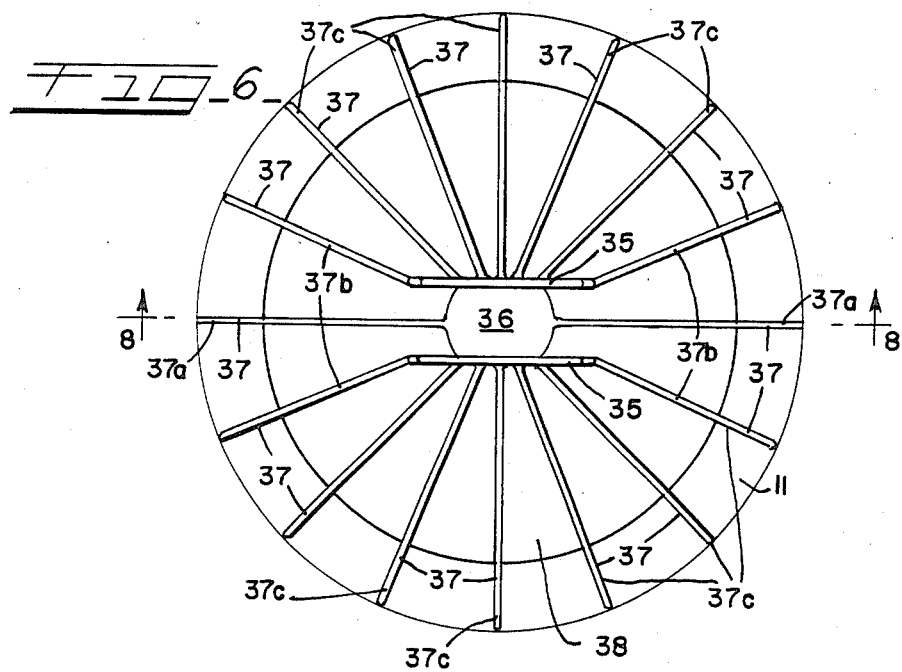
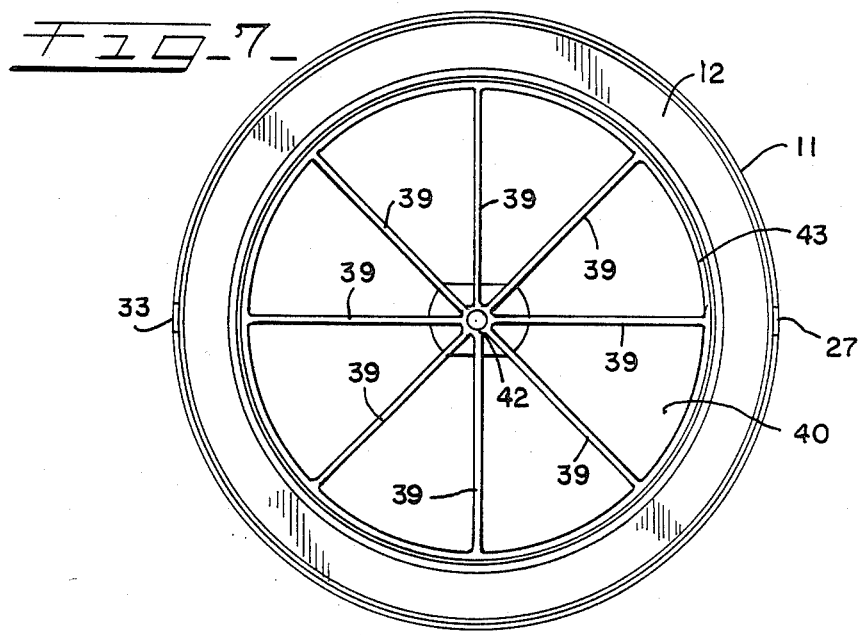
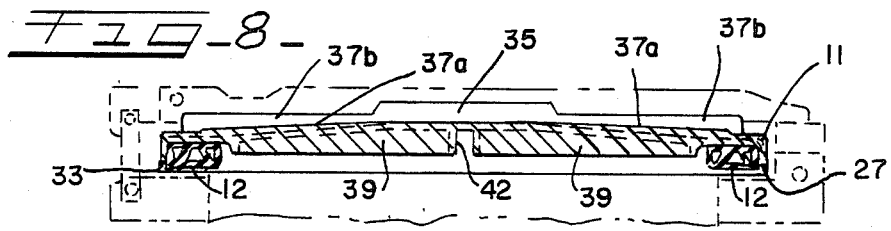

HATCH COVER STRUCTURE

BACKGROUND OF THE INVENTION

1. Field of the Invention

This invention relates to an apparatus for the securement of a hatch cover over an opening, particularly an opening in a railroad hopper car.

2. Description of the Prior Art

Numerous designs exist in the prior art for securing a hatch cover over an opening in a railway car. However, the hatch covers in the prior art are generally constructed from relatively expensive materials, making replacement of the hatch covers costly. Also, replacement of the hatch cover in these designs is generally rendered difficult by the hatch cover being rigidly affixed to the rest of the hatch sealing apparatus. Some designs, such as U.S. Patent Nos. 4,179,999 and 4,248,160, have disclosed apparatus for sealing a hatch cover over an opening wherein the hatch cover has mounting flanges thereon for hinged mounting of the cover to the body of the railway car. These mounting flanges are vulnerable to damage.

SUMMARY OF THE INVENTION

The present invention provides for a hatch cover sealing apparatus wherein the hatch cover may be readily replaced. The hatch cover is composed of relatively inexpensive plastic material, and is retainingly engaged with a locking bar which extends across a coaming in a hopper car and is pivotally associated with the opening. A simple arrangement for entrappingly securing the hatch cover to the locking bar is provided.

The hatch cover is secured only to the locking bar, and the pivot mounting flanges, which would be especially vulnerable in a plastic hatch cover, are eliminated.

Further objects and advantages of the invention will be disclosed hereinafter in the specification, and the scope of the invention will be articulated in the claims.

BRIEF DESCRIPTION OF THE DRAWINGS

FIG. 1 is a partial plan view of the hatch cover arrangement of the invention showing the hatch cover secured over the coaming of the hopper car.

FIG. 2 is a partially cut-away elevational view of the invention, showing the hatch cover secured over the coaming.

FIG. 3 is a partially cut-away elevational view of the hatch cover arrangement showing the hatch cover partially open and moved away from the opening in the hopper car.

FIG. 4 is a partially cut-away enlarged detail elevational view of the hinge structure of the hatch cover arrangement, showing the hinge in the wide-open position wherein the hatch cover is moved completely away from the hatch opening.

FIG. 5 is an exploded perspective view of the hatch cover arrangement of the invention showing the method of attachment of the hatch cover to the locking bar.

FIG. 6 is a plan view of the hatch cover showing the exterior reinforcement web arrangement.

FIG. 7. is a bottom view of the undersurface of the hatch cover, showing the interior reinforcement web arrangement.

FIG. 8 is a section view taken along line 8—8 of FIG. 6.

Description of the Preferred Embodiment

As best shown in FIGS. 1 and 2, a railway hopper car or other container has an upper deck surface or deck means 9 having a hatch ring or annular coaming 10 extending vertically upward therfrom and defining a hatch opening in the deck surface 9. This opening is closed by hatch cover 11 which is sized to cover the opening. A seal is maintained by hatch cover gasket 12 held between hatch cover 11 and coaming 10.

Hatch cover 11 is secured over coaming 10 by hold-down bar or retaining member 15 which extends across the top of hatch cover 11. One end of the hold-down bar 15 is operatively associated with the hinge structure generally designated at 16. Hinge structure 16 includes hinge bracket 17 rigidly affixed to coaming 10. Pivot pin means or bolt 19 pivotally connects hold-down bar 15 with bracket 17.

The end of the hold-down bar 15 distal to the hinge structure 16 is provided with latching portion 21 which is engageable with the latching structure generally designated at 23. Latching structure 23 may be engaged with latching portion 21 to cammingly press latching portion 21 downward, securing the hold-down bar 15 across the coaming and applying downward force on the cover 11 to seal it over the coaming 10. Latching structure 23 may be pivoted to unseal the hatch cover 11 and will retain the cover 11 in a blow-off position, restricting movement of the cover 11 but allowing pressure in the railway car to escape between the coaming 10 and the cover 11. Latching structure 23 may be pivoted completely clear of the latching portion 21 and away from the coaming 10 to be supported above the deck surface 9, as shown in FIG. 3. With the latching structure 23 in this position, the cover 11 is free to pivot fully away from the coaming 10. The latching structure 23 shown in the preferred embodiment is similar to that disclosed in U.S. Pat. application Ser. No. 679,287, filed Dec. 7, 1984, now U.S. Pat. No. 4,655,365, and titled "HATCH COVER LOCK", which is hereby incorporated by reference. However those skilled in the art will realize that a variety of other securing arrangements may be provided to restrain the hold-down bar 15 against movement away from coaming 10.

As is visible in FIG. 3, when the hold-down bar 15 is released and pivoted away from the coaming 10, the hatch cover 11 moves with the hold-down bar 15, uncovering the opening. Rotation of the hold-down bar 15 continues until the fully opened position shown in FIG. 4 is reached, wherein the hatch cover 11 has been moved fully away from the coaming 10.

Hatch cover 11 is secured to hold-down bar 15 by entrapment means. The entrapment means comprises first cover clip means 25 extending through first recess or opening 27 in the hatch cover 11 adjacent the hinge structure 16, and second cover clip means or hook 31 connected to hold-down bar 15 extending downwardly therefrom and through second recess or opening 33 in hatch cover 11 adjacent the latching arrangement 23.

Clip means 31 and 25 extend through recesses 33 and 27 in hatch cover 11 and prevent hatch cover 11 from becoming separated from hold-down bar 15 by vertical and lateral movement with respect thereto. Hatch cover 11 is also secured against lateral movement with respect to hold-down bar 15 by stop means comprising a pair of lug portions 35. One of the lug portions 35 extends upwardly from the hatch cover 11 on each side of the hold-down bar 15.

In the sealed position, hold-down bar 15 engages the hatch cover 11 only at center area 36, distributing an equal load about the perimeter of the hatch cover 11 above the gasket 12. During the operation of uncovering the opening, the only contact between the hatch cover 11 and the hold-down bar 15 is at recesses 27 and 23 and with the lug portions 35, securing the cover 11 to move in concert with hold-down bar 15.

The hatch cover provided with this invention is adapted to be readily replaced. In the preferred embodiment a high-impact styrene plastic material is used for the hatch cover, although those skilled in the art will readily see that other materials, as well as other designs of hatch cover, might be used without departing from the scope of the invention.

The hatch cover 11 of the preferred embodiment is disclosed in FIGS. 6,7, and 8. As best shown in FIG. 6, the upper surface 38 of the hatch cover 11 is provided with sixteen exterior reinforcing webs or ribs 37 extending upwardly from the upper surface 38 of the hatch cover 11 and radially outwardly from the center area 36 of the hatch cover 11. Each web 37 is oriented at $22\frac{1}{2}°$ relative to the adjacent web 37.

The central web 37a extends across the cover 11 between recesses 27 and 33, and between lug portions 35 below hold-down bar 15. Central web 37a extends upward and terminates below the height of center area 36 to accommodate hold-down bar 15 which engages center area 36 during sealing. The first webs 37b adjacent central web 37a are formed as radially extending extensions of lug portions 35. The remaining webs, indicated by reference character 37c extend radially outwardly from the outer surface of lug portions 35.

The inner surface or underside 40 of hatch cover 11 is provided with interior reinforcing webs or ribs 39 extending downwardly from the inner surface 40. The eight interior webs 39 extend radially away from center structure 42 and are spaced at angular intervals of 45°. Interior webs 39 terminate at reinforcing ring or annular member 43, which is spaced radially inwardly of the perimeter of cover 11 to accommodate sealing gasket 12 supported adjacent the perimeter of cover 11.

Reinforcing webs 37 and 39 serve to structurally strengthen the flattened conical shape of the hatch cover 11. This is desirable when the hold-down bar 15 is secured by latching mechanism 23, applying downward force at the center area 36. This downward force is transmitted radially outwardly through the body of the hatch cover 11 and through the reinforcing webs 37 and 39 to the outer perimeter of the hatch cover 11 to result in a downward sealing force on gasket 12 and coaming 10.

Loadings are also created in the cover 11 by forces near the perimeter of the cover 11 tending to rotate the cover 11 about an axis parallel to the hold-down bar 15. These forces are resisted by the lug portions 35 engaging the hold-down bar 15 and the recesses 27 and 33 engaging the clip means 25 and 31. The portion of the hatch cover 11 between the point of applied force and the point of the reaction force at recesses 27 and 33 and lug portions 35 acts as a moment arm, and the cover 11 is rigidified in this role by reinforcing webs 37 and 39.

The use of first and second clip means 25 and 31 to support the hatch cover 11 eliminates the hinge mounting flanges of prior art hatch covers. The elimination of mounting flanges is particularly beneficial where the hatch cover is formed of plastic material, which would be especially vulnerable to cracking in the hinge flanges.

Replacement of the hatch cover 11 is effected by removing pivot bolt 19 which allows hinge structure 16 to be disassembled as shown in FIG. 5. As best shown in FIG. 5, hold-down bar 15 includes hinge channel portion 44. Hinge channel portion 44 includes central web 46 and downwardly extending side flanges 48. Flanges 48 are each provided with openings 50 therein for receiving pivot bolt 19. Hold-down bar 15 also includes clip portion 54 supporting clip means 25. Clip portion 54 has a central wall portion 56 extending laterally with respect to hold-down bar 15, and flange portions 58 extending longitudinally with respect to the hold-down bar 15 from the lateral ends of the wall portion 56. Flange portions 58 are provided with openings 60 for receiving pivot bolt 19.

In the assembled condition shown in FIGS. 1 and 4, flanges 48 of hinge channel portion 44 extend between flange portions 58 of clip portion 54. The inward ends 61 of flanges 48 of channel portion 44 engage wall portion 56 of clip portion 54, and bolt 19 extends through openings 50 and 60. As a result, relatively little relative motion between clip portion 54 and hinge channel portion 44 is possible, and clip portion 54 pivots with the rest of hold-down bar 15 when hold-down bar 15 is pivoted toward and away from the coaming 10.

In the fully open position shown in FIG. 4, hinge channel portion 44 engages hinge stop means 62 supported between vertical flanges 63 of hinge bracket 17. This prevents rotation of the hold-down bar 15 beyond the fully open position, and prevents the hold-down bar 15 from impacting the upper deck surface 9.

Hatch cover 11 is entrapped by first clip means 25, second clip means 31, and lug portions 35 to move with hold-down bar 15. When bolt 19 is removed, clip portion 54 separates from channel portion 44 of the hold-down bar 15, which may be moved upward and away from the hinge structure 16. This withdraws hold-down bar 15 from between the lug portions 35. Hatch cover 11 is also permitted to move longitudinally with respect to locking arm 15 when clip portion 54 is detached. Longitudinal movement moves recess 33 away from second clip means 31 at the distal end of the hold-down bar 15, fully disengaging the hatch cover 11 from locking arm 15.

A new hatch cover may be engaged with hold-down bar 15 by slipping recess 33 of the hatch cover 11 over second clip means 31. The hatch cover 11 is symmetrical, so that either of the recesses may be fitted over second clip means 31 with the same result. The hatch cover 11 is moved towards hold-down bar 15 to receive hold-down bar 15 between its lug portions 35. Clip portion 54 is fitted over the channel portion 44, causing clip means 25 to enter recess 27 in the hatch cover 11. The combined hatch cover and hold-down bar structure is inserted between generally vertical flanges 63 of hinge bracket 17 until openings 50 and 60 align with openings 70 in hinge bracket flange 63. Pivot bolt 19 is inserted through openings 50, 60 and 70 and secured therein by securing means or nut 73, completing the operation of replacement.

The foregoing description and drawings merely explain and illustrate the invention, and the invention is not limited thereto except insofar as the eppended claims are so limited, as those skilled in the art who have this disclosure before them will be able to make modifications and variations therein without departing from the scope of the invention.

What is claimed is:

1. A hatch cover arrangement for a lading container having a deck means defining a hatch opening, said hatch cover arrangement comprising:

hinge means fixedly supported on the lading container;

a retaining member having a first hinge connection portion operatively associated with the hinge means for pivoted movement of the retaining member with respect to the hatch opening, a second portion connected with the first portion and extending across the hatch opening, and a third portion connected with the second portion;

a hatch cover adapted to cover the hatch opening;

a latch arrangement operatively associated with the container and with the third portion of the retaining member for securing the retaining member over the hatch cover for sealing the hatch opening;

said hatch cover having a first opening therein adjacent the hinge means and a second opening therein adjacent the latch arrangement;

said retaining member having first and second clip means thereon extending into the first and second openings respectively and entrappingly engaging said hatch cover therein to secure the hatch cover with said retaining member whereby said hatch cover is supported to move in concert with the retaining member as said retaining member is pivoted toward and away from said opening; and one of said clip means being selectively withdrawable from the associated opening in the hatch cover;

the hatch cover being freed for movement away from the other of the clip means and out of entrapping engagement therewith when said one of the clip means is withdrawn from the associated opening whereby the hatch cover may be readily removed from the retaining member for replacement of the hatch cover.

2. The invention according to claim 1, and
said hatch cover having stop means thereon engageable with the retaining member for preventing lateral movement of the hatch cover with respect thereto.

3. The invention according to claim 2, and
said stop means comprising a pair of laterally spaced, upwardly extending lug portions, said retaining member extending therebetween.

4. The invention according to claim 1, and
said hatch cover being formed of plastic material.

5. The invention according to claim 1, and
said hatch cover having a central portion being engaged with the retaining member when sealing the hatch opening.

6. The invention according to claim 1, and
said hatch cover having reinforcing web means thereon for strengthening the hatch cover to support loads therein.

7. The invention according to claim 6, and
said reinforcing web means comprising
exterior reinforcing webs extending generally upwardly from the hatch cover in the sealed position and radially outwardly with respect to the hatch cover.

8. The invention according to claim 6 and
said reinforcing web means comprising
reinforcing webs connected to said hatch cover and extending generally downwardly therefrom, said reinforcing webs extending generally radially outwardly with respect to the hatch cover.

9. The invention according to claim 8 and
said reinforcing webs having radially outward terminal end portions, and
a generally annular reinforcing member connected to the terminal end portions.

10. The invention according to claim 1 and
said clip means each comprising
a first portion supported outwardly of the periphery of the hatch cover and
a second portion connected with the first portion and extending therefrom generally inwardly of the hatch cover below a portion thereof for securing the hatch cover against substantial vertical movement away from the retaining member, the hatch cover extending between the first portions of the first and second clip means.

11. The invention according to claim 1 and
one of said clip means being detachably secured to the retaining member to facilitate removal of the hatch cover from the arrangement for replacement.

12. A hatch cover arrangement for a lading container having a deck means defining a hatch opening, said hatch cover arrangement comprising:

hinge means fixedly supported on the lading container;

a retaining member having a first hinge connection portion operatively associated with the hinge means for pivoted movement of the retaining member with respect to the hatch opening, a second portion connected with the first portion and extending across the hatch opening, and a third portion connected with the second portion;

a hatch cover adapted to cover the hatch opening;

a latch arrangement supported on the container and adapted to co-act with the third portion of the retaining member for securing the retaining member over the hatch cover for sealing the hatch opening;

said hatch cover having a first opening therein adjacent the hinge means and a second opening therein adjacent the latch arrangement;

said retaining member having first and second clip means thereon adapted to enter the first and second openings respectively for entrappingly engaging said hatch cover with said retaining member whereby said hatch cover is supported to move in concert with the retaining member as said retaining member is pivoted toward and away from said opening;

said hatch cover having reinforcing web means thereon for strengthening the hatch cover to support loads therein;

said reinforcing web means comprising
exterior reinforcing webs extending generally upwardly from the hatch cover in the sealed position and radially outwardly with respect to the hatch cover; and said hatch cover having stop means thereon engageable with the retaining member for preventing lateral movement of the hatch cover with respect thereto;

one of said webs being connected to the stop means for the reinforcement thereof.

13. A hatch cover arrangement for a lading container having a deck means defining a hatch opening, said hatch cover arrangement comprising:

hinge means fixedly supported on the lading container;

a retaining member having a first hinge connection portion operatively associated with the hinge means for pivoted movement of the retaining member with respect to the hatch opening, a second portion connected with the first portion and extending across the hatch opening, and a third portion connected with the second portion;

a hatch cover adapted to cover the hatch opening;

a latch arrangement supported on the container and adapted to co-act with the third portion of the retaining member for securing the retaining member over the hatch cover for sealing the hatch opening;

said hatch cover having a first opening therein adjacent the hinge means and a second opening therein adjacent the latch arrangement;

said retaining member having first and second clip means thereon adapted to enter the first and second openings respectively for entrappingly engaging said hatch cover with said retaining member whereby said hatch cover is supported to move in concert with the retaining member as said retaining member is pivoted toward and away from said opening;

said first hinge connection portion comprising:

a first member fixedly connected with said second portion of the retainer member; and a second member engaging said first member for movement therewith as the retaining member is pivoted toward and away from the hatch opening;

said second member supporting said first clip means.

14. The invention according to claim 13, and said second member having a pair of generally vertically extending laterally spaced flange portions receiving said first member therebetween.

15. The invention according to claim 13, and said first member having downwardly extending laterally spaced flange portions engaging said second member.

16. The invention according to claim 13, and said hinge structure including a pivot pin means extending through said first and second members for securing said first and second members with each other in engaging contact.

17. A hatch cover arrangement for a lading container having a deck means defining a hatch opening, said hatch cover arrangement comprising:

hinge means fixedly supported on the lading container;

a retaining member extending across and above the hatch opening, said retaining member having a first portion operatively associated with the hinge means whereby the retaining member is pivoted toward and away from the hatch opening, and said retaining member having a second distal portion;

a hatch cover supported on the retaining member and adapted to cover the hatch opening;

a latch structure being supported on the container and being engageable with the second portion for securing the retainer member and sealing the hatch cover over the hatch opening;

entrapment means on the retaining member for securing the hatch cover against movement vertically with respect to the retaining member; and stop means on the hatch cover for preventing lateral movement of the hatch cover with respect to the retaining member whereby the hatch cover is secured to move with the retaining member for opening and closing the hatch opening;

the entrapment means comprising first and second clip means;

each of the clip means extending generally below a respective portion of the hatch cover and engaging the hatch cover to secure the hatch cover against substantial movement downwardly with respect to the retaining member;

one of said clip means being selectively withdrawable from below the hatch cover; and the hatch cover being freed for movement away from the other of said clip means and out of engagement therewith when said one of said clip means is withdrawn from below the hatch cover whereby the hatch cover may readily be replaced.

18. The invention according to claim 17, and said stop means comprising a pair of laterally spaced, generally upwardly extending lug portions on the hatch cover;

said retaining member extending between said lug portions whereby the hatch cover is secured against substantial lateral movement with respect to the retaining member.

19. The invention according to claim 17, and said first clip means being supported on the first portion of the retaining member and said second clip means being supported on the second portion of the retaining member.

20. The invention according to claim 19, and said hatch cover having first and second openings therein receiving said first and second clip means respectively.

21. The invention according to claim 19, and said hinge means having a pivot pin member therein; and said first portion of said retaining member receiving said pivot pin member for pivotal movement of said retaining member about said pivot pin member.

22. The invention according to claim 17, and said hatch cover being formed of plastic material.

23. The invention according to claim 17, and said hatch cover having reinforcing web means thereon for strengthening the hatch cover to support loads therein.

24. The invention according to claim 23, and said reinforcing web means comprising reinforcing webs extending generally upwardly from the hatch cover in the sealed position and radially outwardly with respect to the hatch cover.

25. The invention according to claim 23, and said reinforcing web means comprising reinforcing webs connected to said hatch cover and extending generally downwardly therefrom, said reinforcing webs extending generally radially outwardly with respect to the hatch cover.

26. The invention according to claim 25, and said reinforcing webs having radially outward terminal end portions, and a generally annular reinforcing member connected to the terminal end portions.

27. A hatch cover arrangement for a lading container having a deck means defining a hatch opening, said hatch cover arrangement comprising:
- hinge means fixedly supported on the lading container;
- a retaining member extending across and above the hatch opening, said retaining member having a first portion operatively associated with the hinge means whereby the retaining member is pivoted toward and away from the hatch opening, and said retaining member having a second distal portion;
- a hatch cover supported on the retaining member and adapted to cover the hatch opening;
- a latch structure being supported on the container and being engageable with the second portion for securing the retainer member and sealing the hatch cover over the hatch opening;
- entrapment means on the retaining member for securing the hatch cover against movement vertically with respect to the retaining member; and
- stop means on the hatch cover for preventing lateral movement of the hatch cover with respect to the retaining member whereby the hatch cover is secured to move with the retaining member for opening and closing the hatch opening;
- said entrapment means comprising a first clip means supported on the first portion of the retaining member and a second clip means supported on the second portion of the retaining member;
- said hinge means having a pivot pin member therein; and
- said first portion of said retaining member receiving said pivot pin member for pivotal movement of said retaining member about said pivot pin member; and
- said first clip means comprising a clip portion receiving said pivot pin member for pivoted movement thereabout, said pivot pin member securing the clip portion in engagement with the first portion whereby said clip portion pivots in concert with said first portion.

28. A hatch cover arrangement for a lading container having a deck means defining a hatch opening, said hatch cover arrangement comprising:
- hinge means fixedly supported on the lading container;
- a retaining member extending across and above the hatch opening, said retaining member having a first portion operatively associated with the hinge means whereby the retaining member is pivoted toward and away from the hatch opening, and said retaining member having a second distal portion;
- a hatch cover supported on the retaining member and adapted to cover the hatch opening;
- a latch structure being supported on the container and being engageable with the second portion for securing the retainer member and sealing the hatch cover over the hatch opening;
- entrapment means on the retaining member for securing the hatch cover against movement vertically with respect to the retaining member; and
- stop means on the hatch cover for preventing lateral movement of the hatch cover with respect to the retaining member whereby the hatch cover is secured to move with the retaining member for opening and closing the hatch opening;
- said hatch cover having reinforcing web means thereon for strengthening the hatch cover to support loads therein; and
- said web means being connected to the stop means for the reinforcing thereof.

29. A hatch cover arrangement pivotally connected with the top of a railway car and comprising:
- a hold-down bar means having a first portion pivotally connected with the top of the railway car;
- the railway car having an opening therein generally adjacent the first portion of the hold-down bar means;
- a cover adapted to cover the opening;
- the hold-down bar means extending above the cover and having a second portion having securing means connecting with the car for securing the hold-down bar means against pivoting away from the opening;
- the cover having a forward end portion and a rearward end portion;
- the hold-down bar means having first and second retaining means thereon entrappingly engaging the forward and rearward end portions respectively whereby the hold-down bar means floatingly carries the cover between opened and closed positions of the cover and the hold-down bar means with the forward and rearward end portions of the cover entrained by the first and second retaining means; and
- one of the retaining means being selectively movable into entrapping engagement and out of entrapping engagement with the cover;
- the cover being free to be moved away from the other of the retaining means and out of entrapping engagement therewith and from the hold down bar means when said one of the retaining means is moved out of entrapping engagement with the cover whereby the cover may be readily removed from the hold-down bar means for replacement of the cover.

30. The invention according to claim 29 and
said retaining means each comprising
- a first portion supported outwardly of the periphery of the cover and
- a second portion connected with the first portion and extending therefrom generally inwardly of the cover below a portion thereof for securing the cover against substantial vertical movement away from the hold down bar means.

* * * * *